June 9, 1942.  A. C. DURDIN, 3D  2,285,697
SEWAGE TREATMENT METHOD AND APPARATUS
Filed July 31, 1939
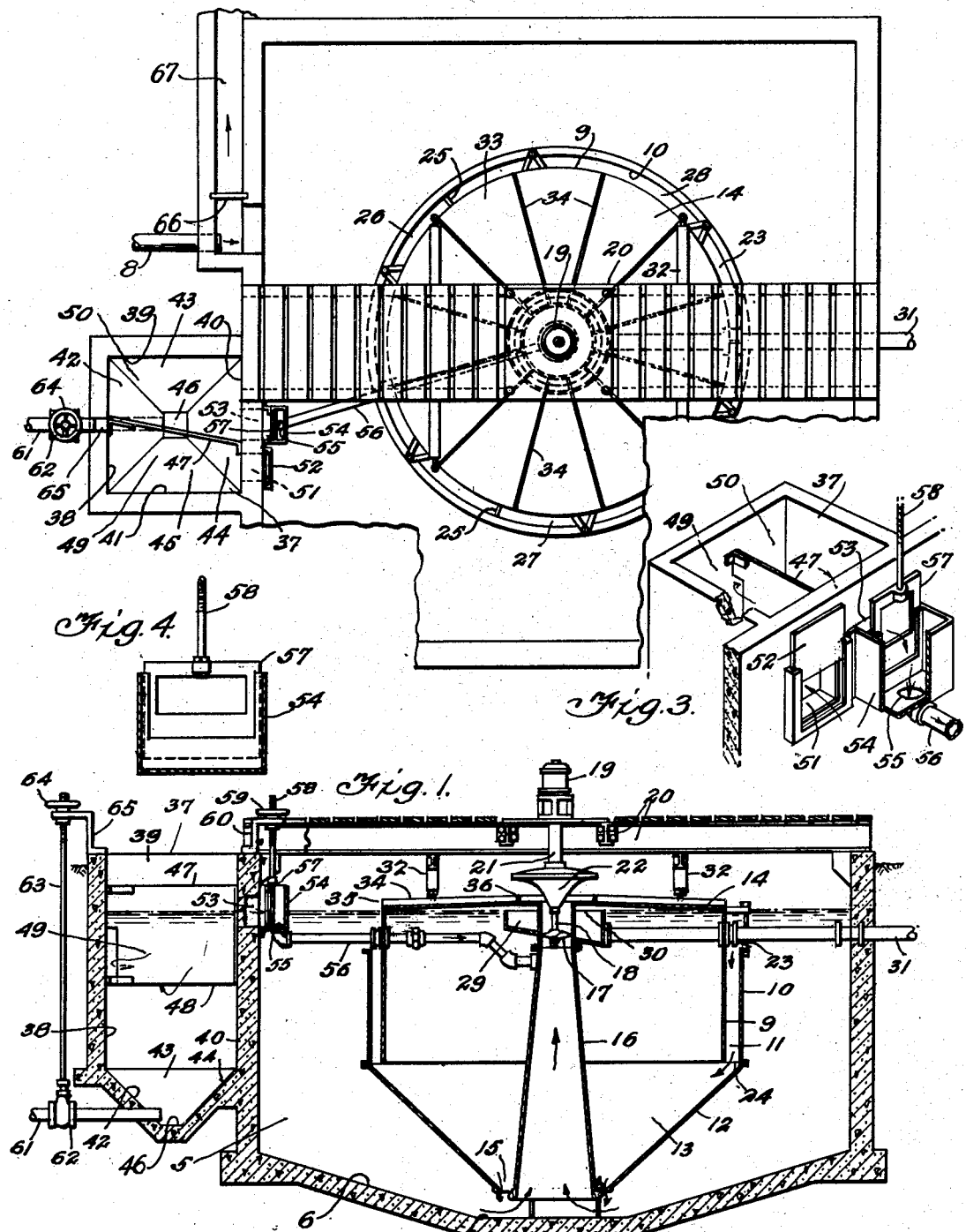
INVENTOR.
Augustus C. Durdin III
BY
ATTORNEY.

Patented June 9, 1942

2,285,697

UNITED STATES PATENT OFFICE 2,285,697

SEWAGE TREATMENT METHOD AND APPARATUS

Augustus C. Durdin, III, Niles Center, Ill.

Application July 31, 1939, Serial No. 287,508

13 Claims. (Cl. 210—8)

This invention relates to sewage treatment apparatus preferably of the kind employed in the activated sludge method of sewage treatment, and a method of effecting the separation of the solids in the sewage from the liquid, of which it is principally composed.

In the activated sludge method of treatment, raw sewage is conducted into a preliminary settling tank in which the readily separable solids settle out of the sewage mixture. After this preliminary settling treatment the fluid sewage carrying suspended and dissolved solids, is conducted into aeration apparatus, one form of which is shown in Patent No. 2,067,161, wherein the sewage is mixed with previously treated sewage to form a mixed liquor which is circulated and supplied with oxygen to support the bacterial life by which the purification of the sewage is effected. After aeration and purification of the sewage, it is necessary to separate the solids from the liquid constituents of the sewage mixture, and my invention is directed particularly to the problem of providing suitable apparatus and a suitable method to accomplish this.

During the process of aeration of sewage the organic impurities carried in the fluid sewage in the form of suspended and dissolved solids, coagulate into fine brownish flocs, which are known as "activated sludge." This activated sludge, when circulated with sewage in the presence of oxygen, induces the nitrification necessary for the purification of the sewage.

The activated sludge coagulated within the sewage forms a settleable solid within the sewage mixture, and the remainder of the sewage forms a fairly clear and readily separable liquid effluent.

As the activated sludge process is generally performed in equipment designed for the constant flow of the sewage, apparatus is required to enable the effluent to be readily drawn off and the activated sludge accumulated. The activated sludge cannot be permitted to accumulate indefinitely as the process operates most efficiently when the solids within the mixed liquor are maintained within a fairly uniform range, depending upon the character of the sewage being treated. Accordingly, proper quantities of activated sludge must be separated from the mixed liquor and removed during the performance of the process. The sludge to be separated from the mixed liquor is known as "waste sludge."

The problem of separating waste sludge from the mixed liquor is complicated by the fact that all of the separable activated sludge cannot be removed, as suitable quantities, depending upon the character of the sewage being treated, must be retained in the sewage mixture to aid in the purification process.

Thus, for example, I have found that in the treatment of ordinary domestic sewage which, after preliminary settling, may contain 80 to 100 parts of suspended solids per million of sewage, the remainder being principally water, a desirable ratio of solids in the mixed sewage in the aerating apparatus may be in the range of 800 to 1000 parts per million. Accordingly, in the separation of solids from the treated sewage mixture, it is desirable to remove approximately the same proportion of solids as are being introduced by the sewage being treated. Removal of solids in excess of those being added would reduce the proportion of solids in the aeration apparatus and lower the efficiency of the process, while removal of less than the normal increment contained in the input of the plant would lead to an increase of solids in the aeration apparatus beyond the efficient operating range.

This problem is further complicated by the fact that while sewage from a single municipality may be fairly constant in composition with respect to the proportion of solids to liquid, the proportion is variable and constantly fluctuating. Accordingly, apparatus designed for the removal of solids must be capable of accurate and ready adjustment.

The problem of separating the waste sludge from the mixed liquor in continuously operating plants is further complicated by the fact that the flow of sewage is not constant in volume, but varies from day to day and from hour to hour throughout the day. In addition to these normal variations in the volume of sewage flowing through the purification apparatus, storms and other unusual situations create overloads and abnormal loads of greatly increased volume. Sewage apparatus to accommodate these loads successfully must be able to effect the necessary fairly uniform purification and separation under these increased loads.

The object of this invention is to provide a settlement tank or clarifier within which the separation of waste activated sludge from the mixed liquor can be carried on without interruption of the flow of sewage and the process of purification, and which can be readily adjusted and set to operate constantly and effect an approximately uniform separation of the waste activated sludge from the mixed liquor.

Another object of my invention is to provide a settlement tank or clarifier which, although adjusted and set to effect a continuous and substantially uniform separation of the waste activated sludge from the mixed liquor, will perform its functions and operate under excessive and abnormal loads without adjustment or attention and will automatically accommodate itself to the load variations encountered in normal sewage plant operation.

Another object of my invention is to provide settlement apparatus and a method of sewage treatment by which this settlement can be effected in a tank of very small dimensions and without protracted retention of large amounts of sewage.

Another object of my invention is to provide settlement apparatus wherein the rate of separation and sedimentation can be constantly observed and easily controlled, and wherein the rate of separation in proportion to the flow of sewage through the plant will be substantially maintained in spite of excessive and widely variant volume of flow through the apparatus.

My invention is clearly illustrated in the drawing accompanying this specification, in which:

Figure 1 is a vertical section through sewage treatment apparatus, incorporating the clarifier of my invention which is the subject matter of this specification, and designed to perform the sewage treatment process of my invention;

Fig. 2 is a plan view of the clarifier and a fragment of the aerating unit of the sewage treatment apparatus;

Fig. 3 is a phantom perspective view of the clarifier in operation;

Fig. 4 is a detail view of the adjustable weir in the outlet from the clarifier.

Referring to the drawing, the reference character 5 designates the aeration tank which has a hopper-like bottom 6 desirably formed with a flat bottom 7. The tank may be of polygonal or circular form as desired. A sewage influent conduit 8 enters the tank near its upper end and discharges the sewage thereinto. An overflow weir 66 and overflow channel 67 are also provided to by-pass excessive flows which may arise during heavy rains.

The aeration tank 5 is provided with suitable apparatus, to be presently described, for mixing the incoming sewage with treated sewage containing a high proportion of solids in the form of activated sludge, and for forcing this mixture through the air to supply the mixture with oxygen necessary to support the bacterial life by which the sewage purification is effected. The aeration tank, in the apparatus shown is also equipped with a final effluent clarifier by means of which the clear liquid left after separation of the solid content of the sewage is removed from the mixed liquor and led from the treatment plant, although this apparatus can suitably be built entirely separately from the aeration apparatus without affecting the principle of my present invention.

In the apparatus shown in the drawing, I have placed both the aeration apparatus and the final effluent clarifier within the aeration tank 5, and the waste sludge clarifier immediately adjacent the aeration tank 5, as this is the most compact and economical form in which the apparatus can be constructed.

Supported in the middle of the aeration tank 5 is a continuous wall 9 preferably cylindrical, surrounded by a second continuous wall 10, also preferably cylindrical. Between the two walls is an annular passageway 11 open at the top and the bottom. At its bottom the outer wall is formed into a truncated inverted cone 12, extended down toward the bottom 7 of the tank. The walls 9 and 12 provide a settling chamber 13 closed at the top by a splash platform 14. The settling chamber has an opening 15 at its lower end through which sludge may settle out from the settling chamber 13 into the space below. The compartments formed within the walls 9 and 12 compose the final effluent clarifier, and with this effluent channel and effluent weir 29, 30, presently to be described, effect the separation of the clarified liquor from the sewage mixture.

Within the final effluent clarifier is the aeration unit which I have shown as a mechanical aeration unit. Other forms of aerating apparatus can also be used without affecting the principle of the process or operation of the apparatus of my invention. Mounted above the bottom 7 of the aeration tank 5 is a draft tube 16 with its mouth disposed a short distance above the bottom 7 of the tank. In the upper end of the draft tube 16 is a propeller 17 mounted upon a shaft 18 driven by a suitable motor, here shown as an electric motor 19, supported by a framework 20 extending across the aeration tank. Above the outlet of the draft tube 16 and the propeller 17 is an inverted stationary diffusion cone 22 suspended from the support 21 also mounted upon the framework 20.

The upper end of the outer wall 10 is located below the level of the mixed sewage liquor contained in the apparatus, rendering the annular passageway 11 between the walls 9 and 10 accessible for the admission of the sewage mixture over the upper edge of the outer wall 10 at 23, as indicated by the arrows. The lower end of the passageway 11 opens at 24 to the settling chamber 13. To promote the downward flow of the mixed liquor and prevent circular motion baffles 25 (shown in Fig. 2) are mounted between the walls 9 and 10 to divide the annular passageway into a number of separate upright passages, such as those indicated by the numerals 26, 27 and 28 in Fig. 2.

Around the throat of the draft tube 16 is an annular effluent channel 29 with its wall in the form of a circular effluent weir 30, which is mounted so as to be adjustable to permit the desired flow of effluent from the apparatus and to maintain the desired liquor level in the aeration tank. Opening into the lower portion of the annular effluent channel 29 is an effluent conduit 31, which extends through the walls 9 and 10 and through the outside wall of the tank 5 to carry the effluent from the aeration tank and out of the sewage plant.

Mounted above the compartment formed by the wall 9 is the splash platform 14. This platform is suspended from the framework 20 by suitable hangers 32, which are preferably adjustable to raise and lower the splash platform 14. As the walls 9 and 10 and the draft tube 16, in the embodiment shown, are hung from the splash platform 14 these may all be raised and lowered by adjustment of the hangers 32. Obviously, separate supports for the various units may be provided.

The splash platform 14 is made up in the form of an unbroken disc divided into segments 33 by the radial flanges 34 which extend from the inner annular rim 36 to the outer edge 35 of the platform.

The waste sludge clarifier of my invention is constructed in the form of a vertical tank 37, shown in the preferred embodiment illustrated in the drawing as rectangular in section. The vertical tank walls 38, 39, 40 and 41 are each inclined toward the bottom. The inclined portions 42, 43, 44 and 45 extend from the lower edges of the vertical walls 38, 39, 40 and 41 to the respective edges of the bottom 46 to form a truncated inverted pyramid. My invention is not limited to a tank of rectangular section with the inverted pyramidical bottom, but may be suitably constructed in other form.

The size of the waste sludge clarifier is to be determined by the volume of flow which it is designed to accommodate. Inasmuch as the solids normally settle out of the mixed liquor produced from the sewage usually treated at a rate of twenty feet per hour, the clarifier must be of sufficient size to permit the maximum flow of mixed liquor to be handled by the clarifier to pass upward therethrough at a velocity below that rate. I have found that a clarifier of a size which permits an upward flow of mixed liquid normally passing through the clarifier at a velocity of ten feet per hour has a capacity which will satisfactorily meet the requirements of this apparatus under both normal and overload conditions.

The tank 37 is divided into two compartments, 49 and 50, by the wall or baffle 47, which extends from a plane well above the normal surface of the liquid within the tank downwardly into the tank to approximately half its depth, but at least to a point substantially below the inlet 51 into the tank. The wall or baffle 47 may extend across the entire width of the clarifier 37 or a part thereof may be spaced from the wall 38 as shown. Between the lower edge 48 of the wall 47 and the bottom of the tank is a passage connecting the compartments into which the clarifier is divided so that the liquid may flow beneath the wall 47 from the compartment 49 into the compartment 50.

As shown in Figs. 1, 2 and 3 the clarifier is connected to the aerating equipment by the inlet 51 in the wall 40, which is preferably placed at approximately the normal liquid level in the clarifier. I have shown this inlet 51 in the form of a rectangular opening in the wall 40 separating the clarifier from the aerating apparatus, but it may be in the form of a pipe or conduit of other section. The inlet 51 must be of sufficient size to permit the maximum desired flow of mixed liquor through the clarifier without obstruction.

The inlet 51 leads into compartment 49 of the clarifier 37. This inlet 51 may be closed by the stopgate 52 which can be raised or lowered by appropriate means, but is normally wide open.

The outlet from the tank is through an opening 53 in the wall 40. This opening 53 leads from compartment 50 of the clarifier 37, while the inlet opening 51 is in the other compartment and beyond the baffle 47 which divides the tank 37 into two compartments. The bottom of the outlet 53 is below the desired level at which the surface of the liquid is to be maintained and the opening extends above that level to a sufficient height so that the opening is unobstructed even when the liquid level rises under abnormal conditions. The opening leads into a collecting box 54 into which the liquid flows. The collecting box 54 is drained through the opening 55 by which the collecting box 54 is connected to the outlet pipe 56.

The outlet opening 53 is provided with an adjustable weir 57 across the bottom of the opening. The weir is suspended from the threaded shaft 58 which can be turned by the hand wheel 59 in order to adjust the weir to the desired level with relation to the liquor level in the clarifier 37. This assembly is mounted upon an appropriate standard 60, which is affixed to the wall 40. The height at which the weir is set is determined by the several factors which determine the rate at which it is desired to waste the sludge solids from the mixed liquor, to be presently described.

The opening 53 in the wall 40 is preferably rectangular in form and the weir 57 should be of a length proportional to the length of the final effluent weir 30 about the effluent channel 29, which has been described. I have found that the weir 57 can be constructed and operated according to the principles of my invention and can be very accurately adjusted and suitably meets the requirements of this apparatus if it is approximately 2 to 50 per cent of the perimetral length of the final effluent weir 30.

While I have shown the weir in the outlet from the waste sludge clarifier, it is evident that the inlet port can be fitted with a weir in lieu thereof and the outlet left open, so as to control the volume of liquor flowing through the clarifier by controlling the flow through the inlet instead of controlling the flow through the outlet.

The pipe 56 leads from the waste sludge clarifier 37 into the aeration equipment and the pipe may be connected either to an impeller or pump, or to a low pressure circuit of any kind leading to the aerating tank 5 so that any liquid flowing into the collecting box 54 will be immediately drawn off and returned to the aeration equipment. In the preferred form of my invention, as shown in the drawing, the outlet pipe leads to the throat of the draft tube 16 just below the propeller 17. When the propeller is operated the hydrostatic head at this point is lower than that of the liquid in any portion of the clarifier and accordingly, any liquid flowing into the collecting box 54 is immediately drawn off through the pipe 56 into the draft tube 16.

At the bottom of the waste sludge clarifier 37 and below the sloping walls 42, 43, 44 and 45 is provided a waste sludge removal pipe 61, which is controlled by an appropriate valve 62 operated by the shaft 63 and hand wheel 64 affixed to the wall 38 of the tank by the bracket 65.

The operation of the clarifier of my invention is as follows:

As sewage enters into the aeration tank 5 through the sewage influent conduit 8, it is mixed with the mixed sewage liquor in that portion of the aeration tank 5 which is external to the final effluent clarifier contained within the inner wall 10. A portion of this mixed liquor flows through the annular opening 23 and the annular passageway 11 between the walls 9 and 10 and into the settling chamber 13, where the liquor is substantially quiescent and the heavier portions settle out at the annular opening 15 at the bottom of the cone 12 and the lighter liquids rise to the surface of the settling chamber 13 for passage over the annular effluent weir 30 into the effluent channel 29 to pass off through the effluent conduit 31. The effluent thus passing off is a clear liquid, practically odorless, and substantially free of solid content.

Although in the preferred embodiment shown in the drawing I have shown the final effluent clarifier consisting of the circular wall 10, the final settling compartment formed by the walls 9 and 12 and covered by the splash platform 14, the annular passageway 11 between the walls 9 and 10, and the effluent channel 29 and the weir 30, mounted within the aeration tank 5, a conventional clarifier in a separate tank may be used, in which case provision would have to be made to return the settled sludge to the aeration tank.

Whether the final effluent clarifier be constructed within the aeration tank 5 or in the form of a separate unit, the final effluent weir is adjusted to a height with respect to the level of the liquid in the tank as will permit the liquid level to remain approximately an inch above the weir when the normal flow of sewage is running through the plant. The length of the weir 30 is so designed with respect to the dimensions of the final effluent clarifier, or the aeration tank if the clarifier is mounted within the tank, and with respect to the volume of sewage to be treated by the plant, to accommodate the normal variations in flow without any substantial rise in the height of the liquor over the weir. In the event a substantially excessive volume is run into the plant, the height of the liquid will rise over the weir 30 and the effluent will flow from the plant in a volume increasing according to the familiar principle of weir operation.

To avoid flooding the apparatus with a volume of liquid which will flow through the plant at such velocity and in such quantities as to interfere with the biochemical action of the activated sludge and possibly sweep the activated sludge flocs out of the system, such as would follow a heavy rainfall, a weir 66 (see Fig. 2) is installed in a by-pass channel at a height approximately one and one-half inches above the height of the weir 30, so that if the liquid level in the apparatus rises more than one and one-half inches above the weir 30, the excess will flow over the weir 66 and out of the sewage treatment apparatus through the overflow channel 67.

As the clear liquid separates from the mixed liquor in the final effluent clarifier and flows from the treatment apparatus over the weir 30, the remainder of the mixed liquid in the aeration tank 5 made up of the incoming sewage, the activated sludge in the aeration tank, and the treated mixture flowing from the splash platform 14, flows through the apparatus for further treatment.

The heavier portions of this mixed liquor pass from the settling chamber 13 and also from the outer compartment of the aeration tank 5 to the bottom of the tank and are drawn into the draft tube 16 by the lowered hydrostatic head, effected by the action of the propeller 17, by which they are also thrown against the diffusion cone 22 to be discharged upon the splash platform 14, to pass again into the outer chamber of the aeration tank 5 to be mixed with inflowing sewage entering through the conduit 8.

Throughout this action the inflowing sewage is exposed to and mixed with activated sludge flocs present in the treated sewage, and as this mixture is discharged through the air above the splash platform 14, oxygen is in this manner supplied to the mixture and the activated sewage treatment effected.

As the activated sludge treatment progresses and clear effluent passes over the weir 30 from the mixture, the activated sludge flocs increase and age within the mixed liquor and the solids carried by the incoming sewage accumulate.

As the treatment apparatus is first placed into operation, this accumulation of activated sludge is desirable and necessary to provide the required quantity and quality of activated sludge. For example, normal domestic sewage, after preliminary settling, ordinarily contains from 80 to 100 parts per million of suspended solids. For efficient operation of the sewage treatment apparatus and method, the solid content of the mixed liquor in the aeration tank 5 should be in order of 800 to 1000 parts per million. When the solids are above this range the treatment is faster but more expensive because of the increased demand for oxygen.

Obviously, if no solids were removed from the mixed liquor during the treatment of the sewage, solids carried into the apparatus by the incoming sewage would accumulate and bring the solid content of the mixed liquor above the optimum range.

Because the accumulating quantity of solids increases the demand for oxygen, substantial portions of the activated sludge solids in the sewage must be wasted from the mixed liquor in order that the process may continue.

To effect this separation of appropriate quantities of the accumulating solids, a portion of the treated mixed liquor is permitted to flow from the outer chamber of the aeration tank 5 into the waste sludge clarifier 37 through the inlet 51. The clarifier is so located that the flow of mixed liquor from the aeration tank to the waste sludge clarifier will be induced solely by gravity and the level of the liquor in the clarifier will be thus maintained at the level of the mixed liquor in the aerating tank.

The amount of the mixed liquor which is permitted to flow into the waste sludge clarifier 37 is controlled entirely by the relative levels of the liquid in the aeration tank 5 and the clarifier 37, although this flow can be cut off entirely by the stop-gate 52. As the mixed liquor enters the inlet compartment 49 of the tank 37 its velocity is suddenly retarded and the separable solids in the mixed liquor immediately begin to settle out. The solids are deposited at the bottom of the tank where, by reason of the sloping walls 42, 43, 44 and 45, the wasted sludge is accumulated at the low point of the tank.

Because of the continuous flow of mixed liquor into compartment 49 from the aerating tank into which sewage is continuously flowing, and the continuous flow through the outlet 53 from compartment 50, the mixed liquor from which the solids are being settled passes beneath the wall 47 into the other compartment 50 of the clarifier 37. Settling of the solids continues throughout the time the mixed liquor is within the clarifier, as long as the upward flow of the liquid does not exceed twenty feet per hour, and as the separation is effected clear liquor rises to the surface of the liquid in the tank and through the outlet 53 over the adjustable weir 57 into the collection box 54, from which it is drawn off through the opening 55 and the return pipe 56.

The return pipe 56 is connected to the draft tube 16 and because of the low hydrostatic head in the draft tube 16 this liquor is drawn through the outlet tube 56 to the aeration tank. By this means the collection box 54 is constantly drained of the accumulated clear liquor, which is returned to the aeration tank for mixture with incoming sewage, and mixed liquor and there aerated as described.

As the amount of sludge to be wasted from the mixed liquor must be carefully controlled, both to avoid the accumulation of excessive activated sludge in the aeration tank and also to prevent too rapid a removal of the activated sludge flocs from the mixed liquor being detained within the aeration tank, and as the solids are substantially completely separated from the mixed liquor passing through the clarifier 37, the amount of sludge wasted from the sewage being treated can be readily controlled by controlling the volume of mixed liquor which is run through the waste sludge clarifier.

If all of the sewage being treated were run through the waste sludge clarifier 37, all of the solids would be removed from the mixed liquor and the process would cease. If too little of the sewage were run through, not sufficient mixed liquor would be treated in this stage to waste the necessary quantity of sludge and solids would accumulate beyond the quantities permissible for continued operation of the process.

The amount of separation is readily controlled in the clarifier of my invention by controlling the volume of the mixed liquor permitted to flow through the waste sludge clarifier and there subjected to solids separation, with respect to the volume of sewage being treated by the entire plant.

Inasmuch as the inlet 51 into the clarifier 37 is larger than the outlet 53 therefrom, the volume permitted to flow through the clarifier is determined by the relative levels of the liquids within the aeration tank 5 and the waste sludge clarifier 37, and as the latter is directly controlled by the height at which the weir 57 is set, adjustment of this weir varies the volume flowing through the clarifier 37.

As the weir 57 can be raised or lowered to establish the desired hydrostatic differential between the respective levels of the liquor in the clarifier 37 and in the aeration tank 5 the volume of mixed liquor passing through the clarifier 37 can be controlled by the handwheel 59 which operates the weir.

It is evident that with a fairly constant flow of sewage through the plant, if the weir 57 is set at the same level as the weir 30, the volume of mixed liquor flowing through the waste sludge clarifier will bear the same ratio to the volume of final effluent flowing over the weir 30 as the length of the weir 57 bears to the length of the weir 30. Thus, if the weir 57 is 10 per cent of the length of the weir 30, only one-tenth of the volume of the sewage passing through the plant will flow through the waste sludge clarifier. With the length of the weir fixed, the proportion of flow through the clarifier to the flow through the plant and over the final effluent weir 30 can be modified by raising or lowering the weir 57 with respect to the height of the weir 30.

Thus, for example, in treating normal domestic sewage containing 80 to 100 parts solids per million, if the solid content of the mixed liquor in the areation tank is within the optimum range of 800 to 1000 parts per million, whenever a volume of sewage equal to the volume in the plant is run through the plant, an amount of solids equal to one-tenth of those in the treated sewage will be added thereto, unless steps are taken to remove an equal quantity of the solids. To maintain the solid content of the mixed liquor within the optimum range it is necessary to remove a quantity of solids equal to that being introduced by the input of sewage. As the solids separation can be performed only after the sewage is treated and is performed by passing the mixed liquor, containing 800 to 1000 parts solids per million (a concentration ten times as great as that in the sewage), through the waste sludge clarifier, to remove a quantity of solids equal to that being carried by the sewage, it is necessary to pass through the clarifier a volume of mixed liquor equal only to one-tenth of the volume of sewage being treated. To effect this separation, an outlet weir 57 can be used which is 10 per cent of the length of the final effluent weir 30, and if the two weirs are set at the same level, the flow through the waste sludge clarifier will be 10 per cent of that through the aeration tank 5 and over the weir 30. If either the ratio of the solid content in the sewage to that in the mixed liquor, or the ratio of the respective weirs is, an in practice it frequently will be, different from that given in this example, the flow through the waste sludge clarifier can be correctly proportioned by raising or lowering the weir 57.

As the clarifier 37 is in part uncovered, and the operation is readily observable by the operator, a rough determination of the proper height at which the weir 57 is to be set can be made by observing the liquor passing through the waste sludge clarifier. It can readily be seen whether or not solids are being deposited in satisfactory quantities by the passing liquor and the flow of the liquid through the clarifier can be readily adjusted by varying the height of the weir 57 until a satisfactory rate of deposit is observed.

A daily check upon the operation of the plant is usually made by measuring the solid content in the mixed liquor. This is usually done by settling the solids in a measured sample of the mixed liquor in a centrifuge, and measuring the solids. If the solid content in the mixed liquor is rising, more mixed liquor must be passed through the waste sludge clarifier. Lowering the weir 57 will readily increase the flow and the solids being wasted, and will thus reduce the solid content of the mixed liquor.

With the height of the weir 57 established to permit a satisfactory flow of the mixed liquor through the clarifier and a satisfactory deposition of solids therefrom, the volume of flow and separation will remain fairly constant as long as the volume of sewage passing through the aeration tank and the solid content of the sewage being introduced into the plant remain unchanged. Any change in the volume of the sewage flowing into the treatment apparatus is immediately reflected by a change in the level of the liquor within the aeration tank and the clarifier, and above the weirs 30 and 57, with a resultant corresponding increase in the volume of flow over the respective weirs.

Any reduction in the flow of sewage into the aeration tank merely results in a correspondingly reduced flow over the weir 30. Similarly, any lowering of the liquor level in the aeration tank will be reflected in a reduction of the level of the liquor in the clarifier and a reduced flow of the liquor through the clarifier and over the weir 57 into the collection box 54, with an attendant reduction of solids separation.

Likewise, when the flow of sewage is increased the level of the liquor within the aeration unit will rise and create a corresponding increase in the flow of the clear liquor over the effluent weir 30 and out of the sewage apparatus while the flow of the treated mixed liquor into the clarifier is correspondingly increased, with a resultant rise in the level of the liquor in the clarifier 31. The resultant rise of the liquor in the clarifier 37 results in an increased flow of the liquor over the weir 57 and an increase in the volume of mixed liquor from which solids are being separated.

Thus, any change in the rate of flow of the sewage through the aeration tank is attended by a change in the discharge of the clear effluent over the weir 30 and a substantially proportionally corresponding flow of the mixed liquor through the clarifier 37.

It will be readily seen that by the use of this apparatus a fairly uniform rate of separation in relation to the volume of flow can be maintained in spite of the varying volume of the flow of sewage through the apparatus, and that the apparatus will accommodate and uniformly treat varying quantities of sewage without frequent adjustment.

The accumulating waste sludge which is deposited at the bottom of the tank 37 can be pumped out through the waste sludge draw-off pipe 39 into the digestion tanks or other facilities for disposal. Removal must be sufficiently frequent so that the accumulating sludge does not become septic or accumulate in such quantities as to interfere with the operation of the waste sludge clarifier.

While I have shown the control of the weir 57 of the waste sludge clarifier by vertical adjustment thereof, I do not confine myself to vertical adjustment for the weir's effective length may be adjusted and the flow can thus be controlled.

While I have shown oxygen supplied by a mechanical aerator, I do not confine myself to supplying oxygen by a mechanical aerator for oxygen can be supplied by discharging air into the mixed liquor.

Having thus described my invention, what I claim as new and desire to secure by Letters Patent is:

1. A clarifier for use with sewage purification apparatus including an aeration tank comprising a clarifier tank composed of substantially vertical walls and a bottom, an inlet therein for conducting sewage containing suspended solids from the aeration tank into the clarifier tank, an outlet opening in one wall of said clarifier tank, a vertically adjustable weir across said opening, a baffle separating said inlet from said outlet opening, means to regulate the height of said weir, and means to return the liquor flowing from said clarifier over said weir to the aeration tank.

2. A clarifier for use with sewage purification apparatus including an aeration tank comprising a clarifier tank composed of substantially vertical walls and a bottom, a baffle therein, an inlet in a wall of said clarifier tank for conducting sewage containing suspended solids from the aeration tank into the clarifier tank, an outlet opening in a wall of said clarifier tank separated from said inlet by said baffle, an adjustable weir for regulating the size of said outlet opening, means for adjusting said weir, and means to withdraw the liquor flowing from said outlet and to return it to the aeration tank.

3. A clarifier for use with sewage purification apparatus including an aeration tank comprising a clarifier tank composed of substantially vertical walls and a bottom, compartments therein open to each other to permit a flow of liquid from one compartment to another, an inlet into said tank for conducting sewage containing suspended solids from the aeration tank into the clarifier tank into one compartment thereof, an outlet opening in said tank in the wall of another compartment thereof, a vertically adjustable weir across said outlet opening, means to withdraw liquid passing from said outlet opening and to return it to the aeration tank, and means to adjust the height of the upper edge of said weir.

4. A clarifier for use with sewage purification apparatus including an aeration tank comprising a clarifier tank composed of substantially vertical walls and a bottom, an inlet therein for conducting sewage containing suspended solids from the aeration tank into the clarifier tank, an outlet opening of substantial length in a wall of said tank and near the top thereof, a baffle separating said inlet from said outlet opening, means for controlling the flow through said outlet opening by changing the height of the lower edge thereof, and means for withdrawing liquid flowing from said outlet and for returning it to the aeration tank.

5. A clarifier for use with sewage purification apparatus including an aeration tank comprising a clarifier tank, an inlet therein for conducting sewage containing suspended solids from the aeration tank into the clarifier tank, an outlet from said tank at the surface of the liquid therein, a baffle separating said inlet from said outlet, a weir across said outlet, means to vary the flow through said outlet by varying the height of said weir, and means to withdraw liquid flowing from said outlet and to return it to the aeration tank.

6. A clarifier for use with sewage purification apparatus including an aeration tank comprising a clarifier tank, compartments therein open to each other to permit a flow of liquid from one compartment to another, an inlet into said tank for conducting sewage containing suspended solids from the aeration tank into one compartment of the clarifier tank, an outlet from said tank opening into another compartment thereof, a vertically adjustable weir across said outlet, means to regulate the height of said weir, means to withdraw liquid passing from said outlet and to return it to the aeration tank, and means for removing solids from the bottom of said tank.

7. A process for clarifying sewage containing solids, consisting of aerating said sewage by discharging said sewage into the atmosphere, conducting said sewage through a final effluent clarifier with a weir therein to permit the clear liquid to flow from said clarifier over said weir and out of the treatment apparatus, conducting a portion of said sewage containing solids by gravity from said aeration tank into a waste sludge clarifier, conducting said portion of the sewage by gravity through said clarifier at a rate of speed sufficiently low to permit the separation of the solids from the liquid in said sewage, conducting the liquid by gravity out of said clarifier over a weir in a wall thereof, controlling the volume of the sewage flowing through said waste sludge clarifier by controlling the height of said second weir, returning the liquid flowing over said weir to the sewage being aerated, and removing the deposited solids from the bottom of said waste sludge clarifier.

8. A process for clarifying sewage containing solids, consisting of conducting said sewage through aeration apparatus and through a final effluent clarifier with a weir therein to separate clear liquid from said sewage and to conduct clear liquid out of the treatment apparatus over said weir, conducting a portion of the sewage being treated by gravity into a waste sludge clarifier by a baffle therein at a rate of speed sufficiently low to permit the separation of the solids from the liquid constituent of said sewage, conducting said liquid by gravity out of said clarifier over a weir, controlling the proportion of said sewage being conducted through said clarifier by controlling discharge from said second weir, returning the liquid flowing over said second weir into the sewage being treated, and removing the deposited solids from the bottom of said clarifier.

9. A sewage treatment apparatus comprising an aeration tank, a sewage inlet into said tank, aeration apparatus to mix the sewage conducted into said tank with treated sewage in said tank, and to aerate said mixture means for operating said aeration apparatus, a final effluent clarifier connected with said tank so as to permit the flow of the sewage being treated into said clarifier comprising a final effluent chamber and a settling compartment, a final effluent weir in said clarifier between said settling compartment and said final effluent chamber to permit clear liquid to separate from said sewage and to flow over said weir into said final effluent chamber and out of the treatment apparatus, means to return the heavier portions of said sewage settling in said clarifier settling compartment to said aeration apparatus, a waste sludge clarifier with an inlet thereinto connected to said aeration tank to permit a portion of the sewage being treated to flow by gravity into said waste sludge clarifier, a baffle in said waste sludge clarifier separating said clarifier into compartments open to each other, the inlet into said clarifier leading into one of said compartments of said clarifier, an outlet opening in another of said compartments of said clarifier, a vertically adjustable weir across said outlet opening, means for returning the liquid flowing over said vertically adjustable weir into said sewage being treated, and means for removing the deposited solids from the bottom of said clarifier.

10. Sewage treatment apparatus comprising means for aerating sewage, means for operating said aeration means, means for admitting sewage to said aerating means; a final effluent clarifier through which aerated sewage is conducted comprising a final effluent chamber and a settling compartment, a final effluent weir in said final effluent clarifier between said final effluent chamber and said settling compartment to permit clear liquid separating from said sewage to flow from said settling compartment over said weir and out of the treatment apparatus, and means to return the solids settling out of said sewage in said final effluent clarifier into said aerating means; a waste sludge clarifier, said waste sludge clarifier having an inlet therein connected to said aerating means to permit a portion of the sewage being treated to flow by gravity into said waste sludge clarifier, a baffle therein, an outlet therefrom, and a vertically adjustable weir in said waste sludge clarifier; means to control the height of said second weir with respect to the height of said final effluent weir so as to proportion the volume of liquid flowing over said second weir to the volume flowing over said final effluent weir; means to return the liquid flowing over said second weir to said aerating means; and means to remove the solids deposited in said waste sludge clarifier therefrom.

11. A method of treating sewage comprising the conducting of sewage containing solids into an aeration tank containing treated sewage with a more concentrated solid content to form a mixture of treated and untreated sewage, aerating said mixture, removing the liquids separating from said mixture by conducting a volume of said liquids substantially equal to the volume of incoming sewage from said mixture over an effluent weir, separating the solids from said mixture by conducting a portion of said mixture by gravity from said aerating tank through a waste sludge clarifier, controlling the concentration of solids in said mixture by proportioning the volume of the portion of the mixture conducted through said waste sludge clarifier to the volume of clear liquids flowing over said effluent weir in the ratio of the concentration of solids in the incoming sewage to the concentration of solids in the mixture being treated.

12. A method of treating sewage comprising mixing untreated sewage containing solids with treated sewage containing a higher concentration of solids, treating the mixture to convert the solids into flocs, separating a portion of the liquid from the flocs and removing the separated liquid from the mixture, separating a portion of mixed liquid and flocs from the main body of the mixture, removing the flocs from the separated portion of the mixture, and returning the liquid from the separated portion of the mixture to the main body of the mixture.

13. A method of treating sewage comprising continuously adding untreated sewage containing solids to treated sewage containing a higher concentration of solids to form a mixture, treating the mixture to convert the solids into flocs, continuously separating a portion of the liquid from the flocs and removing the separated liquid from the mixture, continuously separating a portion of mixed liquid and flocs from the main body of the mixture, removing the flocs from the separated portion of the mixture, and returning the liquid from the separated portion of the mixture to the main body of the mixture, and controlling said separated portion of the mixture to maintain a substantially constant relationship between the volume thereof and the volume of added untreated sewage.

AUGUSTUS C. DURDIN, III.